United States Patent
Besser et al.

(10) Patent No.: US 11,236,849 B2
(45) Date of Patent: Feb. 1, 2022

(54) PRESSING TOOL AND METHOD FOR A RE-PRESSING OPERATION

(71) Applicant: TECHTRONIC CORDLESS GP, Anderson, SC (US)

(72) Inventors: D. Blake Besser, Anderson, SC (US); Julia H. Moylan, Anderson, SC (US); Brent N. Gregorich, Easley, SC (US); James A. Patton, Anderson, SC (US); Tyler J. Rowe, Anderson, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 71 days.

(21) Appl. No.: 16/559,896

(22) Filed: Sep. 4, 2019

(65) Prior Publication Data

US 2021/0062942 A1 Mar. 4, 2021

(51) Int. Cl.
*F16L 13/14* (2006.01)
*B21D 39/04* (2006.01)
*B25F 5/00* (2006.01)

(52) U.S. Cl.
CPC .......... *F16L 13/141* (2013.01); *B21D 39/046* (2013.01); *B25F 5/00* (2013.01); *Y10T 29/5367* (2015.01)

(58) Field of Classification Search
CPC ..... B25B 27/10; B25B 27/146; B21D 39/048; Y10T 29/5367; B25F 5/00
USPC ...................................................... 173/7, 183
See application file for complete search history.

(56) References Cited

U.S. PATENT DOCUMENTS

| | | | |
|---|---|---|---|
| 2,646,304 | A | 7/1953 | Chadwick |
| 3,469,434 | A | 9/1969 | Davis |
| 5,307,664 | A | 5/1994 | Homm |
| 5,377,400 | A | 1/1995 | Homm |
| 5,553,478 | A | 9/1996 | Di Troia |
| 5,611,228 | A | 3/1997 | Dummermuth |
| 6,035,690 | A | 3/2000 | Murayama |

(Continued)

FOREIGN PATENT DOCUMENTS

| | | |
|---|---|---|
| DE | 29502032 U1 | 3/1995 |
| DE | 19826110 A1 | 12/1999 |

(Continued)

OTHER PUBLICATIONS

European Patent Office Extended Search Report for Application No. 19194621.9 dated Jan. 31, 2020 (5 pages).

(Continued)

*Primary Examiner* — Jason L Vaughan
(74) *Attorney, Agent, or Firm* — Michael Best & Friedrich LLP

(57) ABSTRACT

A pressing tool includes a motor, a sensor, and a microcontroller coupled to the motor and the sensor. The microcontroller is configured to cause the motor to operate in a first direction, and obtain a motor parameter from the sensor. The microcontroller is further configured to determine an occurrence of a fault condition of the motor when the motor parameter satisfies a threshold. In response to determining the fault condition, the microcontroller is further configured to cause the motor to change from operation in the first direction to operate in a second direction, pause operation of the motor in the second direction, and resume operation of the motor in the first direction.

20 Claims, 7 Drawing Sheets

(56) References Cited

U.S. PATENT DOCUMENTS

| | | | |
|---|---|---|---|
| 6,035,775 A | 3/2000 | Nghiem | |
| 6,116,118 A | 9/2000 | Wesch, Jr. | |
| 6,138,346 A | 10/2000 | Schutts et al. | |
| 6,202,290 B1 | 3/2001 | Kewitz et al. | |
| 6,240,626 B1 | 6/2001 | Nghiem | |
| 6,244,085 B1 | 6/2001 | Dummermuth | |
| 6,662,620 B1 | 12/2003 | Baron et al. | |
| 6,739,172 B2 | 5/2004 | Wagner | |
| 6,923,037 B2 | 8/2005 | Bowles et al. | |
| 7,036,806 B2 | 5/2006 | Amherd | |
| 7,216,523 B2 | 5/2007 | Frenken | |
| 7,363,799 B2 | 4/2008 | Hamm et al. | |
| 7,409,846 B2 | 8/2008 | Frenken | |
| 7,434,441 B2 | 10/2008 | Frenken | |
| 7,530,294 B2 | 5/2009 | Myburgh | |
| D598,259 S | 8/2009 | Hamm et al. | |
| 7,633,246 B2 | 12/2009 | Bernier et al. | |
| 7,634,859 B2 | 12/2009 | Amherd | |
| 8,056,473 B2 | 11/2011 | Frenken | |
| 8,141,459 B2 | 3/2012 | Myburgh | |
| 8,336,362 B2 | 12/2012 | Frenken | |
| 9,180,583 B2 | 11/2015 | Frenken | |
| 9,227,240 B2 | 1/2016 | MacAdams | |
| 9,808,851 B2 | 11/2017 | Thorson et al. | |
| 10,618,151 B2* | 4/2020 | Kanack | B25B 23/1456 |
| 10,675,805 B2* | 6/2020 | Lutolf | B25B 27/10 |
| 2003/0230132 A1 | 12/2003 | Bowles et al. | |
| 2006/0236743 A1 | 10/2006 | Fay | |
| 2008/0016939 A1 | 1/2008 | Frenken | |
| 2008/0087141 A1 | 4/2008 | Myburgh | |
| 2008/0190246 A1 | 8/2008 | Hsu et al. | |
| 2015/0251256 A1 | 9/2015 | Frenken | |
| 2015/0364889 A1 | 12/2015 | Frenken | |
| 2017/0057040 A1* | 3/2017 | Rzasa | B25F 5/00 |
| 2018/0131151 A1* | 5/2018 | Chahrour | B21D 39/048 |
| 2018/0161844 A1 | 6/2018 | Lutolf et al. | |
| 2018/0161968 A1 | 6/2018 | Lutolf et al. | |
| 2020/0070329 A1 | 3/2020 | Buck et al. | |

FOREIGN PATENT DOCUMENTS

| | | |
|---|---|---|
| EP | 2586569 A2 | 5/2013 |
| EP | 2902153 A1 | 8/2015 |
| FR | 3010254 A1 | 3/2015 |

OTHER PUBLICATIONS

Conbraco Industries, "Apollo PEX One Hand Pinch Clamp Fastening Tool" Instruction Sheet, <www.apolloflow.com>, published Jun. 9, 2017 (2 pages).

ASTM International, "Standard Specifications for Stainless Steel Clamps for Securing SDR9 Cross-linked Polyethylene (PEX) Tubing to Metal Insert and Plastic Insert Fittings", Jun. 28, 2017 (4 pages).

Sharkbite, "PEX Installation Guide", publicly available before Aug. 22, 2018 (13 pages).

* cited by examiner

PRESSING TOOL AND METHOD FOR A RE-PRESSING OPERATION

FIELD

The present application relates to pressing tools, and more particularly to the operation of pressing tools, such as crimping and clamping tools.

BACKGROUND

Cross-linked polyethylene tubing, commonly abbreviated as PEX or XLPE, is often used for domestic water piping to replace traditional copper piping. PEX tubing is typically attached to fittings using compression rings. In its nominal (uncompressed) state, a compression ring can be slid over the PEX tubing and fitting, then compressed using a pressing tool to clamp the PEX tubing to the fitting. Manual pressing tools, including clamping tools for use with clamp rings and crimping tools for use with crimp rings, typically include a pair of handles coupled to pressing jaws by a pivoting linkage arrangement. Automatic or electric pressing tools may be used as well.

SUMMARY

Automatic or electric pressing tools may be configured to detect when a pressing operation (e.g., a crimp or clamp operation) has occurred improperly, and release the pressing jaws. Furthermore, when the electric pressing tool releases the pressing jaws, delays are introduced in completing the pressing operation as the pressing jaws are fully opened before the operation can begin again. Thus, it would be desirable to have an electric pressing tool that could initiate an automatic re-pressing operation (e.g., a re-crimp or re-clamp operation).

In one embodiment a pressing tool is described, according to some embodiments. The pressing tool includes a motor, a sensor, and a microcontroller coupled to the motor and the sensor. The microcontroller is configured to cause the motor to operate in a first direction, and obtain a motor parameter from the sensor. The microcontroller is further configured to determine an occurrence of a fault condition of the motor when the motor parameter satisfies a threshold. In response to determining the fault condition, the microcontroller is further configured to cause the motor to change from operation in the first direction to operate in a second direction, pause operation of the motor in the second direction, and resume operation of the motor in the first direction.

In another embodiment, a method of operating a pressing tool is described, according to some embodiments. The method includes causing, by a microcontroller, an operation of a motor in a first direction, and obtaining, by the microcontroller, a motor parameter from a sensor. The method further includes determining, by the microcontroller, a fault condition from the motor parameter received. In response to determining the fault condition, the method includes causing, by the microcontroller, operation of the motor from the first direction to a second direction, pausing, by the microcontroller, operation of the motor, and resuming, by the microcontroller, operation of the motor in the first direction.

In another embodiment, a pressing tool is described, according to some embodiments. The pressing tool includes a housing and first and second jaws extending from the housing, wherein the first and second jaws are pivotable relative to a portion of the housing between a closed position and an open position. The pressing tool further include a motor supported within the housing and configured to drive the first and second jaws between the closed position and the open position. The pressing tool also includes a current sensor and a microcontroller. The microcontroller is configured to cause the motor to operate in a first direction, obtain a motor current from the current sensor, and determine a fault condition of the motor based on the received motor current. The microcontroller is further configured to, in response to determining the fault condition, change operation of the motor from the first direction to a second direction, pause operation of the motor, and resume operating the motor in the first direction.

Other features and aspects of various embodiments of the application will become apparent by consideration of the following detailed description and accompanying drawings.

DETAILED DESCRIPTION

Figure 1A:
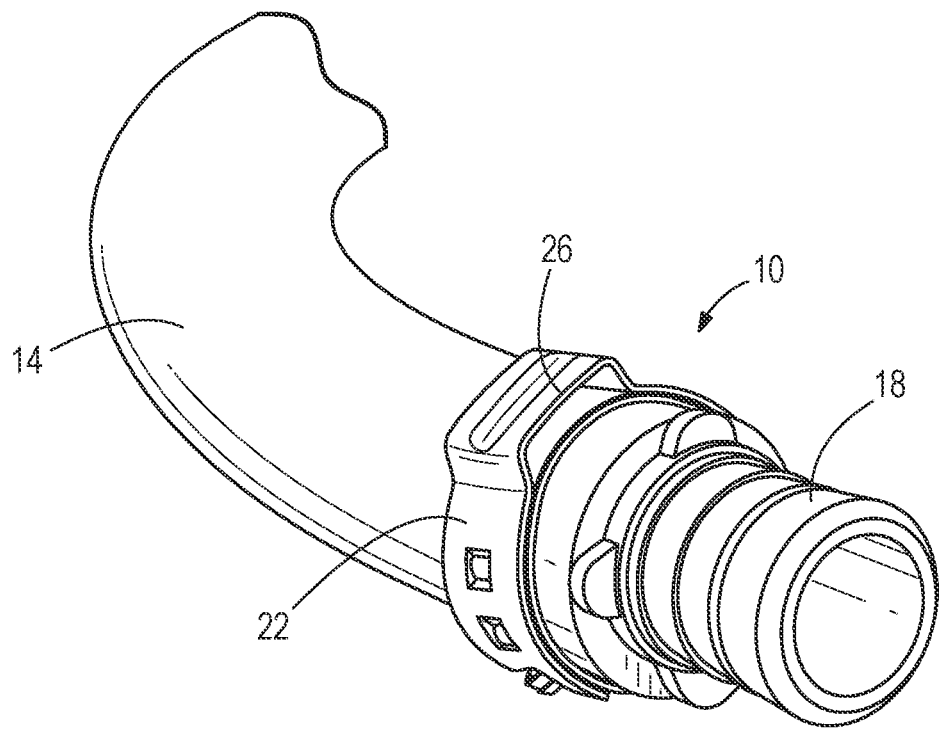
FIG. 1A is a perspective view illustrating a clamp ring in an uncompressed state.

Before any embodiments are explained in detail, it is to be understood that the embodiments are not limited in their application to the details of construction and the arrangement of components set forth in the following description or illustrated in the following drawings. The embodiments may include other constructions and the arrangements of components and may be practiced or carried out in various ways. Also, the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

It should be noted that a plurality of hardware and software based devices, as well as a plurality of different structural components may be utilized to implement the disclosed embodiments. Furthermore, and as described in subsequent paragraphs, the specific configurations illustrated in the drawings are intended as example embodiments and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

Figure 1B:
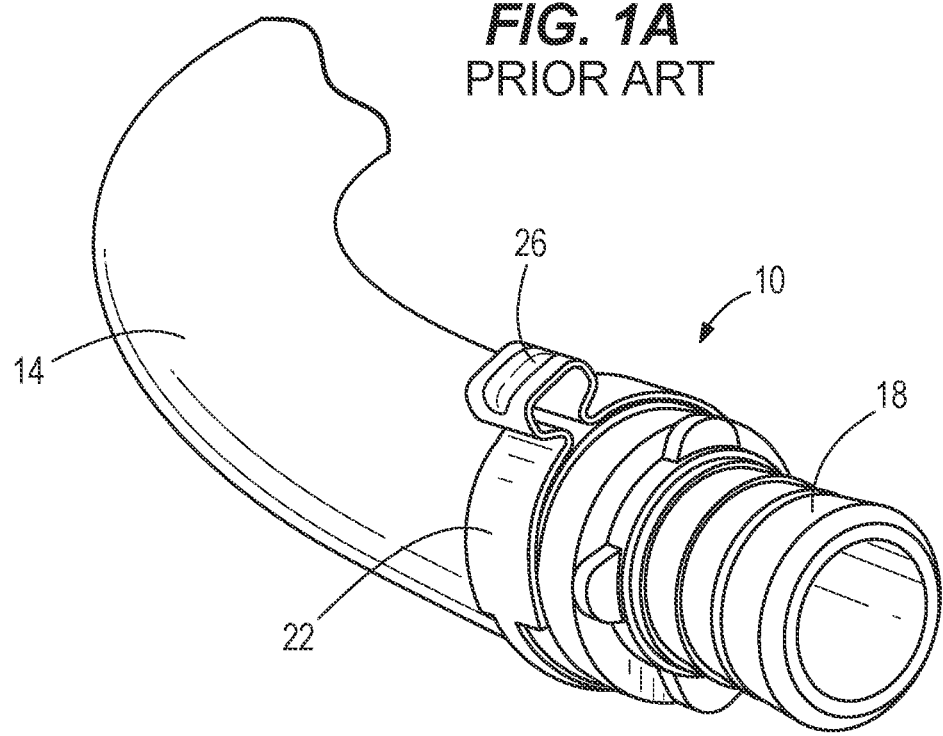
FIG. 1B is a perspective view illustrating the clamp ring of FIG. 1A in a compressed state.
Figure 2A:
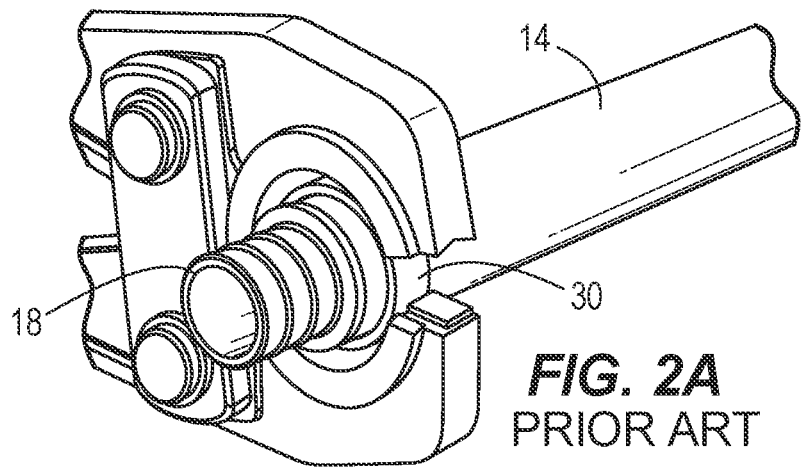
FIG. 2A is a perspective view illustrating a crimp ring in an uncompressed state.
Figure 2B:
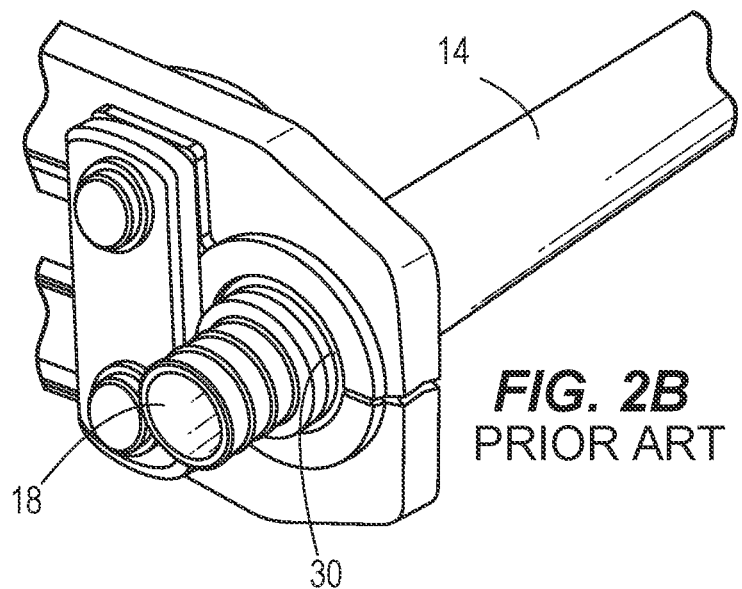
FIGS. 2B and 2C are perspective views illustrating the crimp ring of FIG. 2A in a compressed state.
Figure 2C:
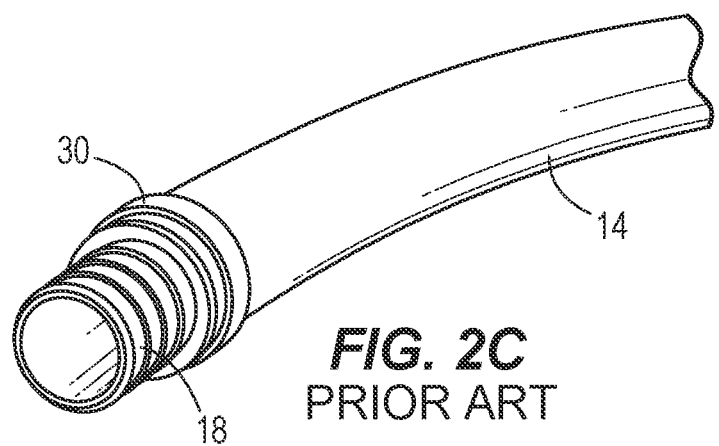

A clamp ring 10, illustrated in FIGS. 1A-1B, is one type of compression ring that can be used to attach PEX tubing 14 to a fitting 18. Clamp rings 10 are typically made of stainless steel and include an outer band 22 with an integral tab 26. In use, the tab 26 is deformed inwardly to reduce the diameter of the outer band 22 and thereby clamp the PEX tubing 14 to the fitting 18. Another type of compression ring that can be used to attach PEX tubing 14 to a fitting 18 is a crimp ring 30, illustrated in FIGS. 2A-2C. A crimp ring 30 is a continuous ring that is typically made of copper. In use, the crimp ring 30 is compressed on all sides to reduce its diameter (FIG. 2B) and thereby crimp and/or clamp the PEX tubing 14 to the fitting 18 (FIG. 2C).

Figure 3:
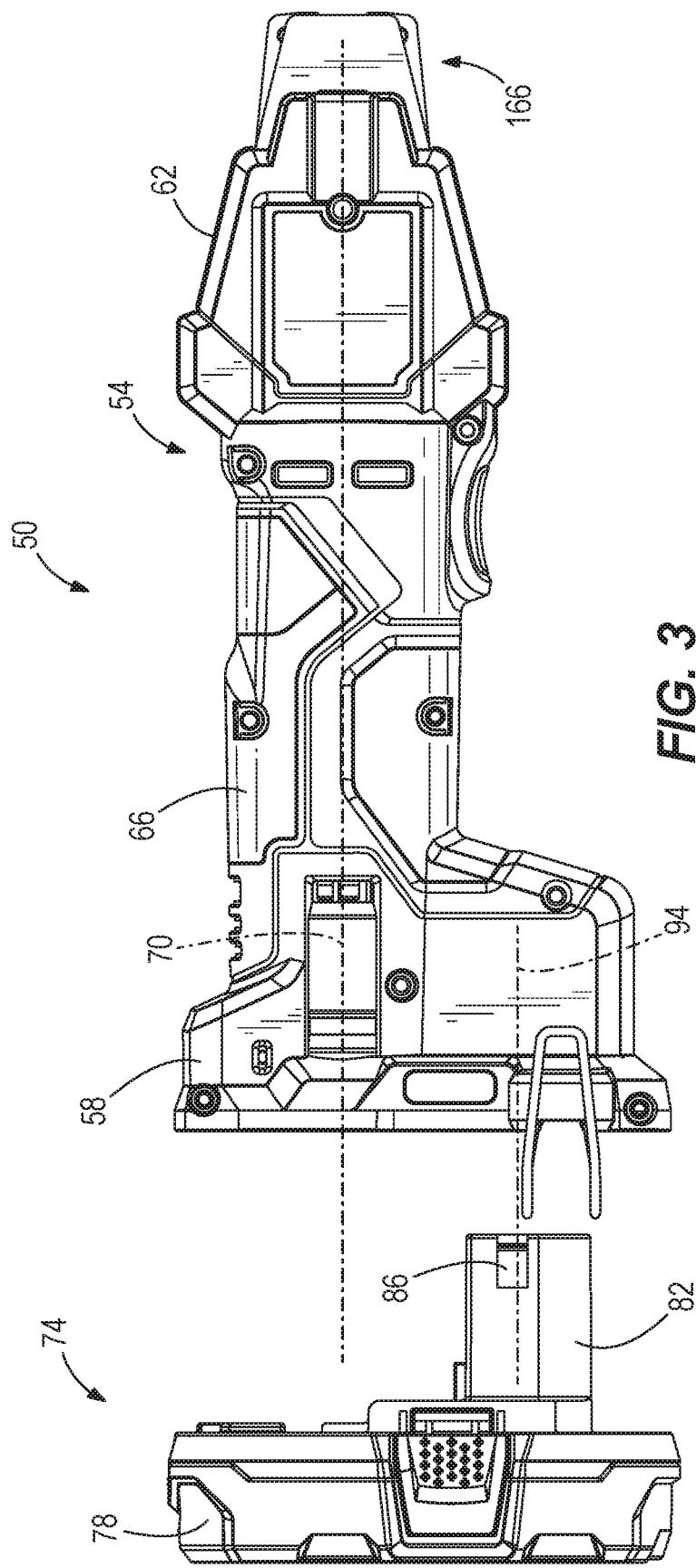
FIG. 3 is a side view of a clamping tool according to an embodiment.

FIG. 3 illustrates a pressing tool 50, which is a PEX clamping tool 50 in the illustrated embodiment. The clamping tool 50 includes a housing 54 having a battery support portion 58, a head portion 62, and a handle portion 66 configured to be gripped by a user during operation of the clamping tool 50. In the illustrated embodiment, the handle portion 66 is generally cylindrical or barrel-shaped and defines a longitudinal axis 70 extending centrally through the handle portion 66. The handle portion 66 is positioned between the battery support portion 58 and the head portion 62, such that the PEX clamping tool 50 has an in-line configuration. In other words, the battery support portion 58, the handle portion 66, and the head portion 62 are arranged in series along the longitudinal axis 70. The in-line arrangement of the clamping tool 50 advantageously provides the clamping tool 50 with a relatively compact shape and size, increasing its usability in tight spaces. In this way, the clamping tool 50 may be more easily maneuvered and/or handled during use. While not shown, in some embodiments, the head portion 62 may be configured at a 90-degree angle to the handle portion 66 and the battery support portion 58. The perpendicular arrangement of the clamping tool 50 may allow for the clamping tool 50 to be used in applications where there the length of the clamping tool would not be able to reach the workpiece. In still other embodiments, the handle portion 66 may be positioned at a 90-degree angle to the longitudinal axis 70, thereby providing a pistol-grip type handle portion 66 to allow the user to maintain greater control of the clamping tool 50.

The battery support portion 58 is configured to support a battery 74 that includes a battery housing 78 enclosing an array of battery cells (e.g., lithium-based rechargeable cells; not shown). A stem 82 extends from the battery housing 78 and includes electrically conductive contacts 86 that are electrically connected to the battery cells. The stem 82 is insertable into a receptacle 90 (FIG. 4) in the battery support portion 58 of the housing 54 along a battery insertion axis 94 (FIG. 3). In the illustrated embodiment, the battery insertion axis 94 is parallel to the longitudinal axis 70. In some embodiments, the battery insertion axis 94 may be coaxial with the longitudinal axis 70, perpendicular to the longitudinal axis 70, or obliquely oriented with respect to the longitudinal axis 70. The receptacle 90 includes electrically conductive contacts 98 (FIG. 4) that engage the contacts 86 on the stem 82 (FIG. 3) when the stem 82 is inserted into the receptacle 90 to transmit power from the battery 74 to the clamping tool 50. In other embodiments, the battery housing 78 may have a number of electrical contacts on one side of the battery housing 78. The electrical contracts and mechanical interface of the battery housing 78 may be configured to allow for the battery to slide into the battery support portion 58 along an axis perpendicular to the battery insertion axis 94 illustrated in FIG. 3. Similarly, the battery support portion 58 can be configured to have corresponding electrical contacts to the electrical contacts on the battery housing 78, along with a latching mechanism for securing the battery 74 into the battery support portion 58. Additionally, in some embodiments, the battery support portion 58 may be configured to accept other applicable battery types as well, such as pod and stick type battery types.

Figure 4:
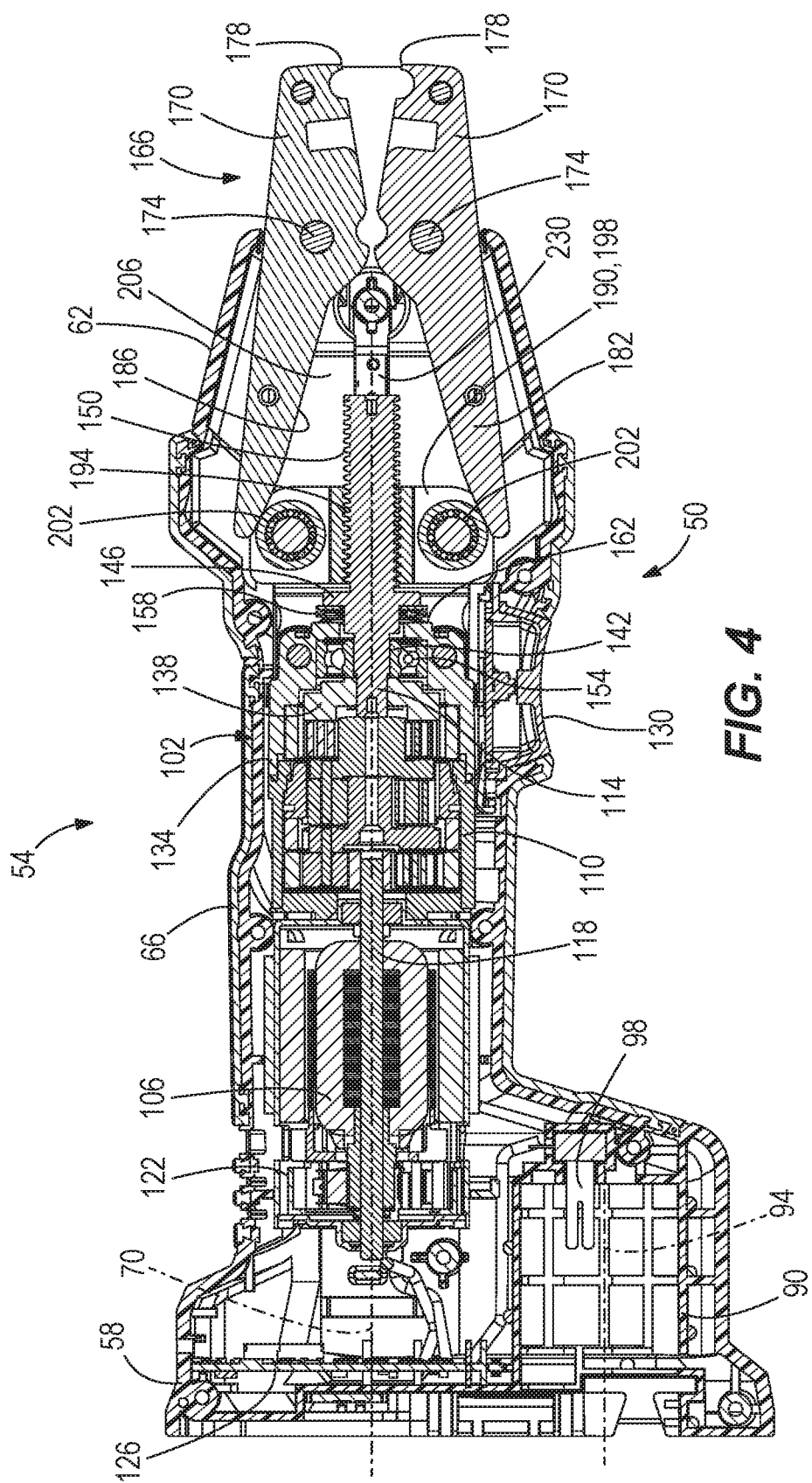
FIG. 4 is a cross-sectional view of the clamping tool of FIG. 3, with jaws of the clamping tool in an open position.

Referring to FIG. 4, the clamping tool 50 has a drive assembly 102 including a motor 106, a transmission 110, and an output shaft 114. In the illustrated embodiment, the motor 106 is a brushed DC electric motor 106 having a motor shaft 118 that is coaxial with the longitudinal axis 70. In some embodiments, the motor 106 may be a brushless motor controllably driven by a FET bridge receiving control signals from a microprocessor or any other suitable electric motor. The motor shaft 118 provides a rotational input to the transmission 110 at one end, and an opposite end of the motor shaft 118 is coupled to a fan 122. In the illustrated embodiment, the fan 122 overlaps the battery receptacle 90 in a direction parallel to the longitudinal axis 70. In other words, a plane can be drawn transverse to the longitudinal axis 70 that intersects both the fan 122 and the battery receptacle 90. This arrangement allows the overall length of the clamping tool 50 to be shortened.

A printed circuit board or PCB 126 is located within the battery support portion 58 of the housing 54. The PCB 126 may include a suitable controller or microprocessor, switching electronics (e.g., MOSFETs, IGBTs, or the like), and other components for controlling the operation of the motor 106, controlling the delivery of power from the battery 74 to the motor 106, obtaining signals from sensors (e.g., Hall effect sensors, and/or the like) and/or switches, controlling the motor 106 based on the signals obtained from the sensors and/or switches, and/or the like. A switch 130 for energizing the motor 106 and, in some embodiments, for controlling a rotational direction and/or operating speed of the motor 106, is located on the handle portion 66 of the housing 54. The switch 130 may be configured as a trigger, push-button, rotary dial, and/or the like.

With continued reference to FIG. 4, the transmission 110 is at least partially housed within a transmission housing or gear case 134 located within the handle portion 66. In the illustrated embodiment, the transmission 110 includes a planetary transmission 110 having three planetary stages, though any number of planetary stages (e.g., more than three, less than three, and/or the like) may be used. The transmission 110 includes a last stage carrier 138 (i.e., the carrier of the third planetary stage) that provides a rotational output from the transmission 110. The last stage carrier 138 may be coupled to the output shaft 114, which may extend into the head portion 62 of the housing 54. In some embodiments, the drive assembly 102 may include other types of transmissions, gear reductions, or the like; or, the output shaft 114 may be directly driven by the motor 106.

In the illustrated embodiment, the output shaft 114 may extend coaxially with the longitudinal axis 70. The output shaft 114 may include a bearing seat 142, a radially-extending flange 146, and a threaded portion 150. The flange 146 may be positioned between the bearing seat 142 and the threaded portion 150. A roller bearing 154 may be fixed to the bearing seat 142 to rotatably support the output shaft 114 in the housing 54. The drive assembly 102 may further include a thrust bearing 158 disposed axially between the flange 146 and a front wall 162 of the gear case 134. The output shaft 114, thus, may be axially fixed relative to the gear case 134.

Figure 5:
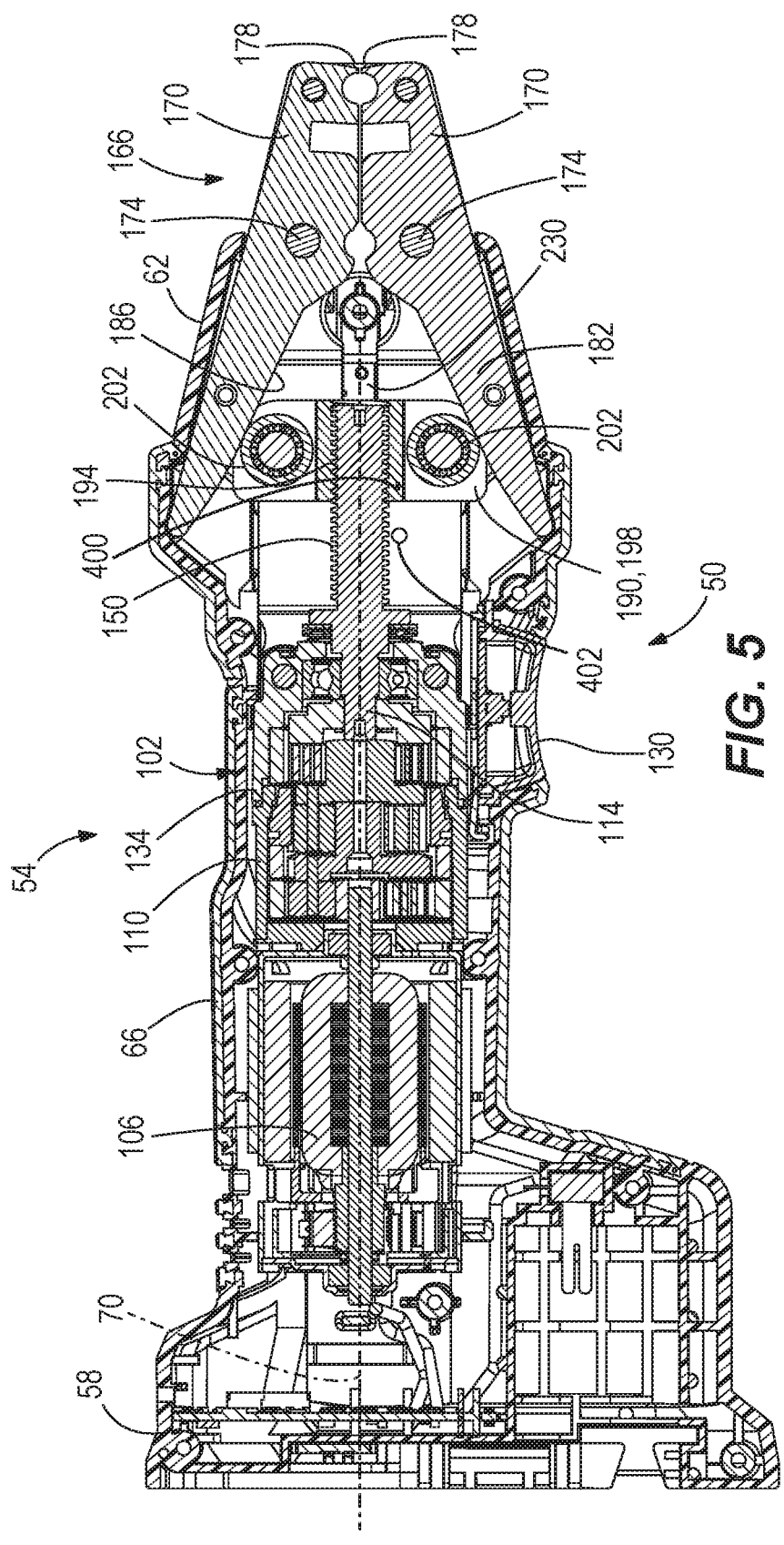
FIG. 5 is a cross-sectional view of the clamping tool of FIG. 3, with the jaws of the clamping tool in a closed position.

The head portion 62 of the housing 54 is configured to support a working assembly 166 that includes a pair of jaws 170 (e.g., comprised of a first jaw and a second jaw). The jaws 170 are pivotable about respective parallel pins 174 between an open position (FIG. 4) and a closed position (FIG. 5). Each of the jaws 170 may include a distal clamping tip 178 and a proximal arm 182 located on opposite sides of the pin 174. The clamping tips 178 are sized and shaped to engage with clamp rings, such as the clamp ring 10 described above with reference to FIGS. 1A and 1B. In some embodiments, crimping dies with other configurations are pivotably coupled to the housing 54 (e.g., in part via the pins 174). For example, the clamping tips 178 may be replaced with a semi-circular crimping die as shown in FIGS. 2A and 2B or other crimping dies. Each of the arms 182 may include a cam surface 186. The jaws 170 may be biased toward the open position by a biasing member (not shown), such as a coil spring or a torsion spring. Alternatively, the jaws 170 may be biased toward the closed position, or the jaws 170 may not be spring-biased.

The drive assembly 102 may additionally include a roller carriage 190 coupled to the threaded portion 150 of the output shaft 114. More specifically, the roller carriage 190 includes a threaded bore 194 through which the threaded portion 150 of the output shaft 114 extends, such that rotation of the output shaft 114 relative to the roller carriage 190 advances or retracts the roller carriage 190 along the output shaft 114 (and thus, along the longitudinal axis 70). The roller carriage 190 includes a main body 198 that rotatably supports two rollers 202. The roller carriage may additionally, or alternatively, support bushings and/or bearings. In some embodiments, the rollers 202 are positioned on opposite sides of the longitudinal axis 70 in the illustrated embodiment. The rollers 202 are engageable with the cam surfaces 186 on the respective jaws 170 to exert a closing force on the jaws 170 when the clamping tool 50 performs a clamping operation. Because the axially-fixed output shaft 114 (which is directly coupled to the transmission 110) is in direct threaded engagement with the roller carriage 190, the length of the drive assembly 102 can be minimized, improving the usability of the clamping tool 50 in tight spaces.

In some embodiments, the roller carriage 190 may include one or more magnets 400 that are in communication with one or more magnetic sensors 402, such as Hall effect sensors. The Hall effect sensors may be in communication with a controller, such as described below. The Hall effect sensors may detect a change in a magnetic field from the magnets as the roller carriage 190 moves along the output shaft 114. The controller may be configured to determine a position of the roller carriage 190 and/or direction of the roller carriage 190 based on the received signals from the Hall effect sensor. For example, the Hall effect sensors may provide an output signal proportional to the proximity of the magnet(s) to the sensors, and which may be correlated (e.g., in a look up table) to position of the roller carriage 190, to allow the controller to determine whether the jaws 170 of the clamping tool are opening or closing. In some embodiments, the magnets 400 may be located on the output shaft 114, such as on the threaded portion 150. In other embodiments, the magnets 400 may be positioned on or near the threaded bore 194 of the roller carriage. In further embodiments, the magnets 400 are positioned on the roller carriage 190, and the magnetic sensors 402 may be located on a stationary portion of the pressing tool such that they can detect a magnetic field generated by the magnets 400 that varies as the roller carriage 190 advances along the longitudinal axis 70.

In operation of the clamping tool 50, the clamping tips 178 of the jaws 170 may be positioned over the tab 26 on a clamp ring 10 (FIG. 1A). A user may depress the switch 130 to provide and/or induce power transfer from the battery 74 to the motor 106, which rotates the motor shaft 118 (FIG. 4). The motor shaft 118 in turn may actuate or drive the transmission 110, and the transmission 110 may actuate or drive the output shaft 114. When the output shaft 114 rotates, the engagement between the threaded portion 150 of the axially-fixed output shaft 114 and the threaded bore 194 of the roller carriage 190 may cause the roller carriage 190 to advance along the longitudinal axis 70 toward the working assembly 166 (i.e. to the right in FIG. 4).

As the roller carriage 190 advances, the rollers 202 are configured to bear against the cam surfaces 186 on the jaws 170, forcing the jaws 170 toward the closed position (FIG. 5). The axial reaction force exerted back on the output shaft 114 is born by the thrust bearing 158, which prevents the output shaft 114 from binding. The roller carriage 190 continues to advance until the jaws 170 reach the closed position (FIG. 5), and the clamp ring 10, or a portion thereof (e.g., tab 26), is properly compressed (FIG. 1B). Once the clamping operation is complete, the motor 106 reverses direction and retracts the roller carriage 190. In the illustrated embodiment, the clamping tool 50 is controlled such that the motor 106 automatically reverses direction when the jaws 170 reach the closed position, as indicated by a first position sensor 230 (e.g., a Hall-effect sensor) supported within the head portion 62. The first position sensor 230 may detect a position of the roller carriage 190 (e.g., by way of magnets positioned therein) to determine when the roller carriage 190 reaches its fully extended position, corresponding with the closed position of the jaws 170. Once the motor 106 reverses direction, a second position sensor 232 (shown in FIG. 6) may detect a position of the roller carriage 190 to indicate when the roller carriage 190 reaches its home position (i.e. a fully-retracted position corresponding with the open position of the jaws 170). In some embodiments, a rotation sensor may additionally or alternatively be provided to determine the position of the roller carriage 190 by counting revolutions of the motor shaft 118 or the output shaft 114. In some other embodiments, one or more limit switches (e.g. solid state, mechanical, etc.) may be configured to interface with the roller carriage 190 such that the switches are actuated when the roller carriage 190 reaches the fully open or fully closed position.

While FIGS. 3-5 illustrate the pressing tool 50 as a PEX clamping tool, in some embodiments, the clamping tips 178 of the pressing tool 50 are replaced within different jaws, such as jaws that form a semi-circular crimping die, as illustrated in FIGS. 2A-B. In such embodiments, the pressing tool 50 is a PEX crimping tool.

Figure 6:
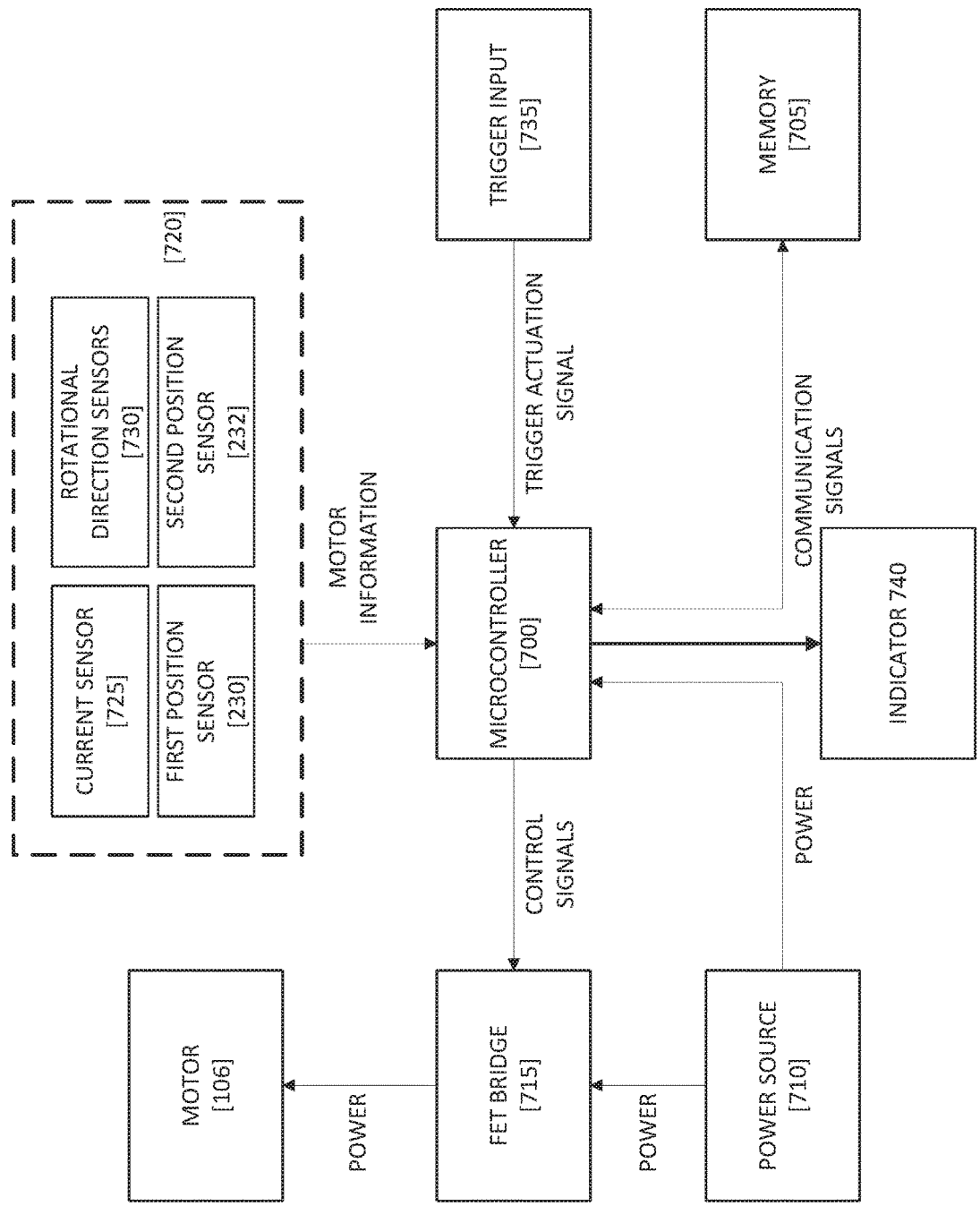
FIG. 6 is a block diagram of the pressing tool according to one embodiment.

FIG. 6 shows a block diagram of the pressing tool 50 according to an embodiment. In some embodiments, the pressing tool 50 is configured as a clamping tool (see, e.g., jaws of FIGS. 3-5) or a crimping tool (see, e.g., jaws of FIGS. 2A-B), depending on the jaws attached to the pressing tool 50. As shown in FIG. 6, the pressing tool 50 may include a microcontroller 700, a memory 705, a power source 710 (e.g., the battery 74), a FET bridge 715, a motor 106, and/or sensors 720. In some embodiments, the microcontroller 700 and memory 705 are mounted on the PCB 126. The microcontroller 700 includes an electronic processor, and the memory 705 stores the program code executable by the electronic processor of the microcontroller 700 to perform operations of the pressing tool 50, including a re-pressing operation as described later with reference to FIG. 7. In some embodiments, the microcontroller 700 and the memory 705 may be collectively referred to as a microcontroller including an electronic processor and memory.

In the present embodiment, the sensors 720 contain a plurality of sensors, for example, the first position sensor 230, the second position sensor 232, a current sensor 725 that detects a motor current, and a rotational direction sensor 730 that detects the driving direction of the motor 106 as either forward or reverse. In one embodiment, the rotational direction sensor 730 is one or more Hall effect sensors. For example, the rotational direction sensor 730 may include a plurality of Hall effect sensors axially spaced from an end of the motor 106 and positioned to detect a magnet of the rotor of the motor 106 as the rotor rotates. The Hall effect sensors are configured to output a digital pulse or analog signal indicative of the magnet of the rotor passing across the face of the sensor, and the microcontroller 700 is configured to determine the direction of rotation of the motor 106 based on the sequence of the pulses received from the Hall effect sensors. In other examples, the rotational direction sensor 730 includes the magnet 400 and Hall effect sensor 402 associated with the roller carriage 190. Similar to above, the Hall effect sensor 402 is positioned to detect the magnet 400 as the roller carriage 190 moves during operation, and the microcontroller 700 is configured to determine the direction of rotation of the motor 106 based on the sequence of the pulses received from the Hall effect sensor 402. In some examples, more than one magnet and/or Hall sensor may be installed on the roller carriage to allow the microcontroller to determine a position of the roller carriage 190 (e.g. position sensors 230, 232). In some embodiments, the sensors 720 may include a variety of other sensors and/or switches that detect other types of motor information, including but not limited to motor current, motor torque, motor voltage, motor position, motor speed, motor operating time, etc. Some embodiments may further use a different number of sensors to obtain the motor information necessary to execute a re-crimp/clamp operation of the pressing tool 50.

As shown in FIG. 6, the power source 710 provides power to the microcontroller 700 and the FET bridge 715. The FET bridge 715 includes one or more power switching devices (e.g., MOSFETs, BJTs, or other transistors) that are respectively activated by control signals from the microcontroller 700 to control the forward and reverse rotation of the motor 106. Thus, the microcontroller 700 is coupled to the motor 106 via the FET bridge 715. The microcontroller 700 initiates operation of the pressing tool 50 after receiving a trigger actuation signal from a trigger input 735, signifying that the user has actuated the trigger 130. During operation, the microcontroller 700 obtain (e.g., receive) motor information from sensors 720 including the current sensor 725 and the rotational direction sensor 730. Based on the received motor information, the microcontroller 700 controls the FET bridge 715 to operate the motor 106 according to various operation methods of the pressing tool 50, such as a crimping or clamping operation. In some embodiments, to operate the FET bridge 715, the microcontroller 700 provides a pulse width modulated (PWM) signal to each power switching device therein. By varying the duty cycle (e.g., between 0-100%), the microcontroller 700 is operable to vary the power supplied to the motor 106 and, thereby, the motor speed, motor torque, or both. Further, by selectively providing particular power switching elements with PWM control signals of varying duty cycles (e.g., using known motor driving techniques), the motor 106 is controlled by the microcontroller 700 to selectively rotate in a forward direction or reverse direction. Some embodiments may include fewer or additional components than those shown in FIG. 6.

The pressing tool 50 may further include an indicator 740. The indicator 740 is controlled by the microcontroller 700 to provide an indication to a user related to the status of a crimping/clamping operation. For example, the microcontroller 700 may instruct the indicator 740 to provide a first indication when the pressing tool 50 successfully completes a crimping/clamping cycle. Similarly, the microcontroller 700 may instruct the indicator 740 to provide a second indication when the pressing tool 50 is unsuccessful in completing a crimping/clamping cycle (e.g., in the case of a jam or other fault). In one embodiment, the indicator 740 is a multi-color LED. Thus, a first indication may be a green light and a second indication may be a red light. In other embodiments, the indicator 740 may be a graphical display capable of displaying text or images to provide indications. In still other embodiments, the indicator 740 may be a sound emitting device (e.g. a speaker) for providing an audio indication to a user. In some examples, the indictor 740 may provide both visual and audio indication to a user.

Figure 7:
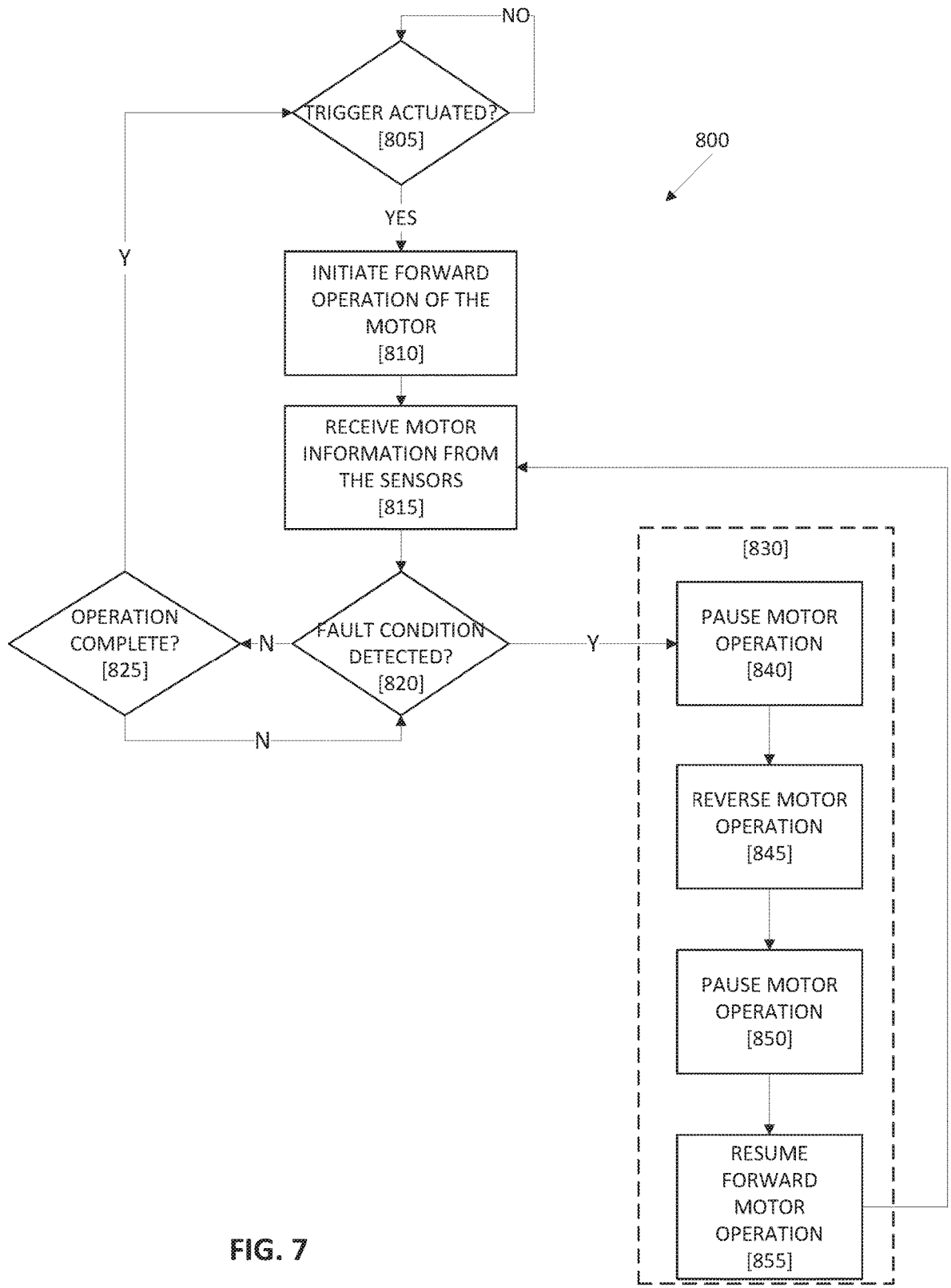
FIG. 7 is a flowchart of a method for a re-press operation of the pressing tool according to one embodiment.

FIG. 7 illustrates a flowchart of a process 800 for a re-press operation of the pressing tool 50 according to an embodiment. Depending on the configuration of the pressing tool 50 (e.g., which type of jaws are attached), the re-pressing operation may be a re-clamping operation (when clamping jaws are attached, such as in FIGS. 3A-C) or a re-crimping operation (when crimping jaws are attached, such as in FIGS. 2A-B). The process 800 enables the pressing tool 50 to detect when the pressing tool 50 becomes jammed during a pressing and to automatically reverse and then resume a pressing operation. Jamming may occur when the clamp rings 10 (or crimp rings 30) are not properly aligned within the jaws 170 of the pressing tool 50. At process block 805, the microcontroller 700 determines whether a trigger activation signal is received from the trigger input 735. Based upon determining that the trigger input 735 was not received, the microcontroller 700 continues to monitor to determine whether the trigger input 735 has been received. In response to determining that the trigger input 735 has been received, the microcontroller 700 causes or initiates operation of the motor 106 in a first direction at process block 810. In one embodiment, the microcontroller 700 controls the FET bridge 715 to supply power from the power source 710 and initiate forward operation of the motor 106. As described above, forward operation of the motor 106 results in the jaws 170 advancing towards the closed position At process block 815, the microcontroller 700 receives one or more motor parameters (also referred to as motor information) from the sensors 720, such as motor current and motor direction. In one embodiment, the microcontroller 700 obtains (e.g., calls, receives, retrieves, and/or the like) the motor information from the sensors 720, such as the current sensor 725 and the rotational direction sensor 730. At process block 820, the microcontroller 700 is configured to identify and/or determine whether a fault condition exits based on the received motor information. The fault condition may indicate a jam which, as noted, may occur when the clamp ring 10 (or crimp ring 30) is oriented incorrectly within the jaws 170, resulting in improper clamping (or crimping). In the one embodiment, the fault condition is determined when the current sensor 725 detects a motor current exceeds a threshold. For example, the fault condition may be identified when the current sensor 725 detects a motor current being at or above a predetermined overcurrent threshold value. In some embodiments, the memory 705 may store one or more tables of current values (e.g., predetermined overcurrent threshold values) for comparison with sensed values to identify fault conditions. In some embodiments, the predetermined overcurrent threshold value is lower, or less than, a predetermined battery overcurrent threshold value. More specifically, the battery 74 may be configured to monitor current discharge and shut down in response to detecting that the current discharge from the battery 74 exceeds a predetermined battery overcurrent threshold value. By setting the predetermined overcurrent threshold value at a value less than the predetermined battery overcurrent threshold value, the microcontroller 700 will detect a fault condition before the battery 74 shuts down due to overcurrent and/or an overcurrent event. In this way, the microcontroller 700 may prevent the battery 74 from detecting and/or experiencing a fault condition (e.g., overcurrent) and shutting down because of the fault condition, such as a jam. It is contemplated that other motor information, such as motor speed (e.g., falling below an expected speed threshold value), motor torque (e.g., exceeding an expected torque threshold value), motor rotor position (e.g., not changing indicating a stall condition), and/or the like, may be used to detect the fault condition in some embodiments.

In response to determining that no fault condition exists, the microcontroller 700 may determine if the operation is completed at process block 825. In one embodiment, the microcontroller 700 determines that the clamping is completed based on a sensed current level (from the current sensor 725) and/or a position of the jaws 170 (from the first sensor 230). For example, in a clamping operation, the current may steadily increase, and then decrease quickly once the clamping operation is completed. The microcontroller 700 may compare the sensed current level over time to various thresholds to determine whether the current approximates a completed clamping current signal curve (e.g., steady increase followed by quick decrease). In some embodiments, the microcontroller 700 determines that the process is completed based on a rotational direction of the motor changing from the forward direction to a reverse direction (e.g., as indicated by the rotational direction sensor 730).

In response to detecting a fault condition, the microcontroller 700 is configured to automatically initiate an automatic re-press process 830. In one embodiment, the automatic re-press process 830 is performed quickly such that a user does not notice that a re-press operation has occurred. For example, the jaws 170 may only open a minimal amount prior to the re-press operation being executed, thereby making the re-press operation imperceptible or nearly imperceptible to a user. In other embodiments, the automatic re-press process 830 allows a user to reposition the pressing tool 50, and/or the clamp ring 10 (or crimp ring 30) within the jaws 170 of the pressing tool 50. During the automatic re-press process 830, the microcontroller 700 pauses forward operation of the motor 106 for a first predetermined time period at process block 840. The first predetermined time period may be one second. However, values of more than one second and less than one second are also contemplated. The microcontroller 700 reverses the direction of the motor 106 for a second predetermined time period at process block 845. The second predetermined time period may be configured to be a time to allow the jaws 170 to open a sufficient amount so as to allow for a user to reposition the pressing tool 50, or the clamp ring 10 (or crimp ring 30) within the jaws 170. The microcontroller 700 pauses reverse operation of the motor 106 for a third predetermined time period at process block 850. In one embodiment, the third predetermined time period is equal to the first predetermined time period. However, in some embodiments, the third predetermined time period may be greater than the first time period to allow the user sufficient time to repositions the pressing tool 50 and/or the clamp ring 10 (or crimp ring 30) within the jaws 170. The microcontroller 700 controls the motor 106 to resume forward operation to attempt to complete the clamping operation at process block 855. The microcontroller 700 the resumes receiving motor data at process block 815.

In some embodiments, one or more of the process blocks of process 800 are bypassed, executed in another order than presented, are executed in parallel or partially in parallel. For example, in some embodiments of the automatic re-press process 830, the process block 840 is bypassed such that, in response to a fault condition being detected in process block 820, the microcontroller 700 proceeds directly to process block 845 to begin reversing the motor operation.

Although the application has described in detail certain embodiments, variations and modifications exist within the scope and spirit of one or more independent aspects of the embodiments as described.

What is claimed is:

1. A pressing tool comprising:
   a motor;
   a sensor; and
   a microcontroller coupled to the motor and the sensor, the microcontroller being configured to:
   cause the motor to operate in a first direction;
   obtain a motor parameter from the sensor;
   determine an occurrence of a fault condition of the motor when the motor parameter satisfies a threshold; and
   in response to determining the fault condition, the microcontroller being further configured to:
   cause the motor to change from operation in the first direction to operate in a second direction,
   pause operation of the motor in the second direction, and
   resume operation of the motor in the first direction.

2. The pressing tool according to claim 1, wherein, in response to determining the occurrence of the fault condition, the microcontroller pauses operation of the motor in the first direction for a first predetermined time period prior to changing operation of the motor to the second direction, and wherein the microcontroller operates the motor in the second direction for a second predetermined time period.

3. The pressing tool according to claim 2, wherein the first predetermined time period is shorter than the second predetermined time period.

4. The pressing tool according to claim 1, wherein the sensor includes a Hall effect sensor configured to detect a rotational direction of the motor.

5. The pressing tool according to claim 1, wherein the sensor includes a current sensor configured to detect a current associated with operating the motor.

6. The pressing tool according to claim 5, wherein determining the occurrence of the fault condition includes determining that the detected motor current exceeds a predetermined current threshold value.

7. The pressing tool according to claim 6, wherein the predetermined current threshold value is less than a battery overcurrent threshold value at which the battery is protected from experiencing an overcurrent condition.

8. The pressing tool according to claim 1, further comprising:
a housing supporting the motor;
first and second jaws extending from the housing;
an output shaft operably coupled to the motor, the output shaft including a threaded portion; and
a roller carriage including a threaded bore that is configured to engage with the threaded portion of the output shaft such that rotation of the output shaft advances or retracts the roller carriage for pivoting the first and second jaws.

9. The pressing tool according to claim 8, further comprising:
a Hall effect sensor; and
one or more magnets coupled to the roller carriage;
wherein the Hall effect sensor is configured to detect a magnetic field associated with the one or more magnets, and to transmit data associated with the detected magnetic field to the microcontroller;
wherein the microcontroller is configured to receive the data from the Hall effect sensor and determine one or more of a position of the roller carriage and a rotational direction of the motor based on the received data.

10. The pressing tool according to claim 1, further comprising:
a housing supporting the motor;
first and second jaws extending from the housing, the first and second jaws including an arm, a cam surface on an inner side of the arm, and a clamping tip, wherein the jaws are pivotable relative to a portion of the housing between a closed position and an open position;
an output shaft operably coupled to the motor; and
a roller carriage supporting first and second rollers, the roller carriage coupled to the output shaft such that rotation of the output shaft in a first direction advances the roller carriage to move the first and second jaws toward the closed position, and rotation of the output shaft in a second direction retracts the roller carriage, allowing the first and second jaws to move toward the open position,
wherein the first and second rollers engage the respective cam surfaces of the first and second jaws when in the open position.

11. A method of operating a pressing tool, comprising:
causing, by a microcontroller, operation of a motor in a first direction;
obtaining, by the microcontroller, a motor parameter from a sensor;
determining, by the microcontroller, a fault condition from the motor parameter received; and
in response to determining the fault condition, the method further comprising:
causing, by the microcontroller, operation of the motor from the first direction to a second direction,
pausing, by the microcontroller, operation of the motor, and
resuming, by the microcontroller, operation of the motor in the first direction.

12. The method of claim 11, wherein, in response to determining the occurrence of the fault condition, the microcontroller pauses operation of the motor in the first direction for a first predetermined time period prior to changing operation of the motor to the second direction, and wherein the microcontroller operates the motor in the second direction for a second predetermined time period.

13. The method of claim 12, wherein the first predetermined time period is less than the second predetermined time period.

14. The method of claim 11, wherein the motor parameter includes a motor current, and wherein determining the fault condition includes determining that the motor current exceeds a predetermined current threshold value.

15. The method of claim 14, wherein the predetermined current threshold value is less than a battery overcurrent threshold value configured to protect a battery from an overcurrent condition.

16. A pressing tool comprising:
a housing;
first and second jaws extending from the housing, wherein the first and second jaws are pivotable relative to a portion of the housing between a closed position and an open position;
a motor supported within the housing and configured to drive the first and second jaws between the closed position and the open position;
a current sensor; and
a microcontroller, the microcontroller being configured to:
cause the motor to operate in a first direction;
obtain a motor current from the current sensor;
determine a fault condition of the motor based on the received motor current; and
in response to determining the fault condition, change operation of the motor from the first direction to a second direction, pause operation of the motor, and resume operating the motor in the first direction.

17. The pressing tool of claim 16, wherein the pressing tool is a clamping tool for compressing a tab of a PEX clamp ring, and wherein the pressing tool further comprises:
a first arm of the first jaw, the first arm having a cam surface on an inner side of the first arm,
a second arm of the second jaw, the second arm having a cam surface on an inner side of the second arm,
a clamping tip;
an output shaft driven by the motor; and
a roller carriage threadingly engaged with the output shaft for supporting first and second rollers, the roller carriage being coupled to the output shaft such that rotation of the output shaft in a first direction advances the roller carriage to move the first and second jaws toward the closed position, and rotation of the output shaft in a second direction retracts the roller carriage, to move the first and second jaws toward the open position,
wherein the first and second rollers engage the respective cam surfaces of the first and second jaws when the first and second jaws move toward the open position.

18. The pressing tool of claim 16, wherein the pressing tool is a crimping tool and the first and second jaws are configured to compress a crimp ring.

19. The pressing tool of claim 16, wherein, in response to determining the fault condition, the microcontroller pauses operation of the motor in the first direction for a first predetermined time period prior to changing operation of the motor to the second direction, and wherein the microcontroller operates the motor in the second direction for a second predetermined time period.

20. The pressing tool of claim 16, wherein determining the fault condition includes determining that the detected motor current exceeds a predetermined current threshold value.

* * * * *